(12) United States Patent
DiEsposti

(10) Patent No.: US 7,619,559 B2
(45) Date of Patent: Nov. 17, 2009

(54) METHOD AND SYSTEM FOR ALL-IN-VIEW COHERENT GPS SIGNAL PRN CODES ACQUISITION AND NAVIGATION SOLUTION DETERMINATION

(75) Inventor: Raymond S DiEsposti, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 11/501,543

(22) Filed: Aug. 9, 2006

(65) Prior Publication Data
US 2009/0262014 A1 Oct. 22, 2009

Related U.S. Application Data

(63) Continuation-in-part of application No. 11/376,681, filed on Mar. 15, 2006.

(51) Int. Cl.
*G01S 1/02* (2006.01)
(52) U.S. Cl. ............... 342/357.09; 342/357.15
(58) Field of Classification Search ............ 342/357.06, 342/357.09, 357.15; 701/207, 213, 215
See application file for complete search history.

(56) References Cited

U.S. PATENT DOCUMENTS 5,781,156 A 7/1998 Krasner
5,812,961 A 9/1998 Enge et al.
6,373,432 B1 4/2002 Rabinowitz et al.
6,914,931 B2 7/2005 Douglas

FOREIGN PATENT DOCUMENTS

EP 1 146 349 10/2001
WO WO 00/36431 6/2000

OTHER PUBLICATIONS

DiEsposti, Raymond; Saks, Steven; Jocic, Lubo; Abbott, Anthony. The Aerospace Corporation. "The Benefits of Integrating GPS, INS, and PCS," pp. 327-331, believed to be at least prior to Aug. 8, 2006.

(Continued)

*Primary Examiner*—Dao L Phan
(74) *Attorney, Agent, or Firm*—Harness, Dickey & Pierce, P.L.C.

(57) ABSTRACT

A method and system for enabling more robust detection, positioning and time solution using GPS satellite ranging signals based on a simultaneous, all-in-view coherent PRN code signal processing scheme rather than acquisition of GPS signals one at a time. Additionally, a plurality of signal processing operating modes are provided that include a Factory Start mode, a Hot Start mode, a Subsequent Fix mode and a Reacquisition mode. Each mode provides a user receiver with an ability to quickly determine its current probable location without undue delay when a prior probable location has been obtained. Preventing undue delay of predicting a probable location of the user can be especially valuable in conditions where weak signals are being received, or in high interference environments, or when signal jamming conditions are being experienced, or when a combination of such environments is present.

23 Claims, 6 Drawing Sheets

OTHER PUBLICATIONS

Kaplan, Elliott D., "Understanding GPS Principles and Applications", 1996 The Artech House, Inc., pp. 212-213, 220-223.

Len Sheynblat et al., "Description of a Wireless Integrated SmartServer™/Client System Architecture," ION 55th Annual Meeting, Jun. 28-30, 1999, Cambridge, MA, pp. 667-675.

Raymond DiEsposti,"GPS PRN Code Signal Processing and Receiver Design for Simultaneous All-in-View Coherent Signal Acquisition and Navigation Solution Determination," ION NTM 2007, Jan. 22-24, 2007, San Diego, CA, pp. 91-103.

ION GNSS 18th International Technical Meeting of the Satellite Division, Sep. 13-16, 2005, Long Beach, CA, p. 1154-1159.

GPS World News and Applications of the Global Position System, Apr. 1998, "Of Mutual Benefit: Merging GPS and Wireless Communications", p. 44-48.

Inside GNSS, Apr. 2006, "NovAtel Gets New Financial Marks, Launches First Galileo Receiver," p. 61.

Lozow, J. B. Navigation: Journal of the Institute of Navigation, vol. 44, No. 1, Spring 1997, Analysis of Direct P(Y)-Code Acquisition, p. 89-97.

Dierendonck, A.J. Van. Institute of Navigation Satellite Division's 4th International Technical Meeting. ION GPS-91, Albuquerque, MN, Sep. 9-13, 1991, "Novatel's GPS Receiver. The High Performance OEM Sensor of the Future."

DiEsposti, Raymond; DiLellio, James; Kelley, Clifford. Navigation Systems, The Boeing Company.; Dorsey, Arthur; Management & Data Systems, Martin, Lockheed; Fliegel, Henry, Berg, John; Edgar, Clyde, GPS JPO, The Aerospace Corporation; McKendree, Thomas, Navigation and Landing Systems; Fullerton, Raytheon; Shome, Pradipta, Office of Commercial Space Transportation, Federal Aviation Administration. ION NTM 2004, Jan. 26-28, 2004, San Diego, CA. "The Proposed State Vector Representation of Broadcast Navigation Message for User Equipment Implementation of GPS Satellite Ephemeris Progagation," p. 294-312.

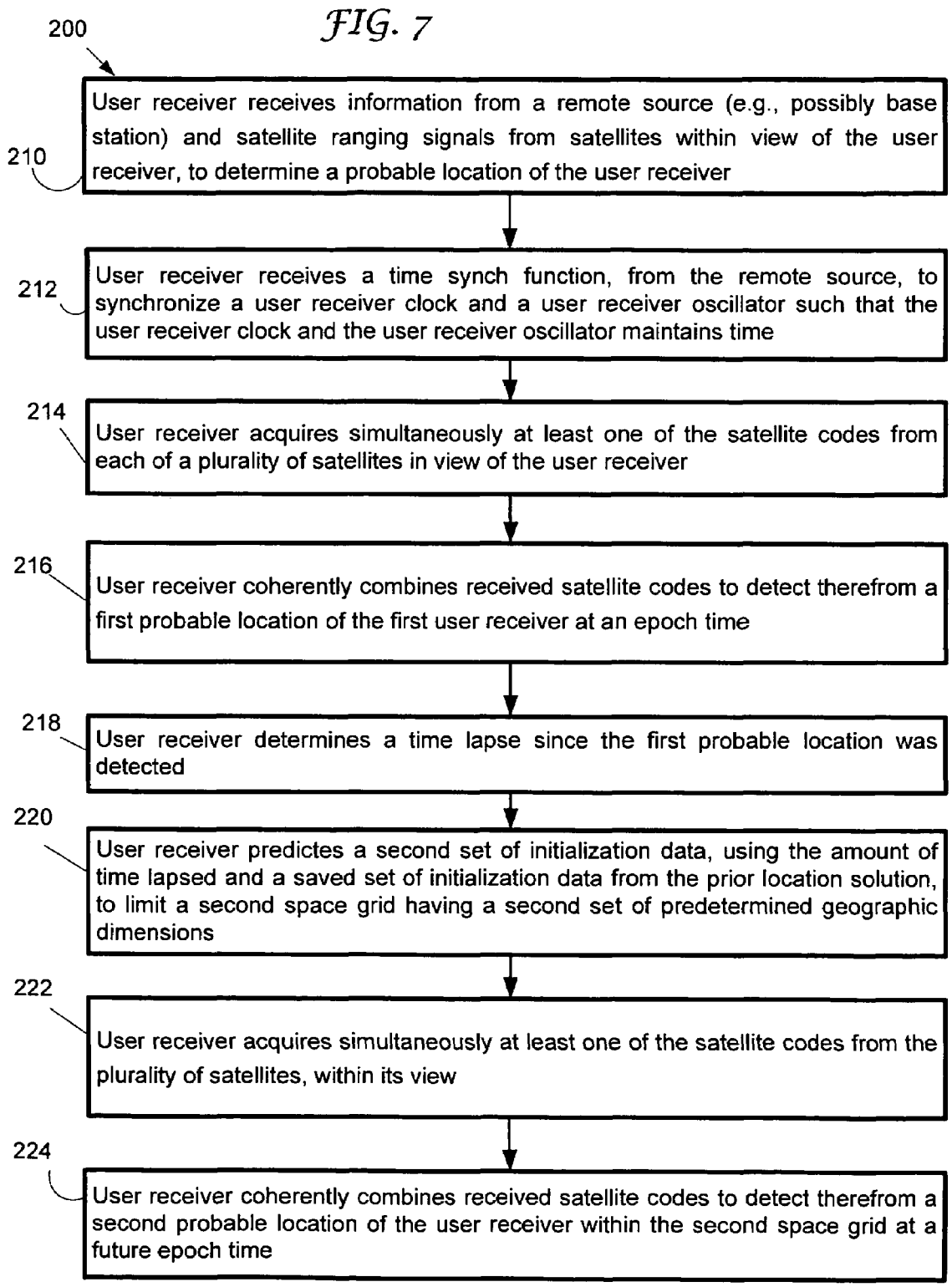

METHOD AND SYSTEM FOR ALL-IN-VIEW COHERENT GPS SIGNAL PRN CODES ACQUISITION AND NAVIGATION SOLUTION DETERMINATION

CROSS-REFERENCE TO RELATED APPLICATIONS

This application is a continuation-in-part of U.S. patent application Ser. No. 11/376,681 filed on Mar. 15, 2006. The disclosure of the above application is incorporated herein by reference. The present disclosure is also related to concurrently filed application U.S. Ser. No. 11/501,556.

FIELD

The present disclosure relates to a method and system for global positioning (GP). More specifically, the present disclosure relates to a method and system for acquiring global positioning system (GPS) signals from satellites to determine a location of a GPS user receiver.

BACKGROUND

For decades, the ability to obtain real time location and position information for mobile platforms and/or individuals has been a highly sough after technology. Since the implementation of the Global Positioning System (GPS), a worldwide radio navigation system introduced by the U.S. Air Force, this has become a reality. The GPS includes a constellation of satellites, ground or base stations, and at least one GPS user receiver.

The locations of the satellites are used as reference points to calculate positions of the GPS user receiver, which is usually accurate to within meters, and sometimes even within centimeters. Each of the satellites, the ground stations, and the GPS user receiver has preprogrammed timed signals that start at precise times. In order to lock on to the signals broadcasted by the satellites, the ground station and GPS user receiver slew their respective internal generated signals relative to time as predicted by their respective internal clocks. When the signals are locked, the GPS user receiver makes ranging measurements to each satellite called pseudoranges. These pseudorange measurements include the actual ranges to the satellites, in addition to an error associated with the receiver clock time offset relative to GPS time, plus other smaller errors. The ground stations included in the GPS control segment network provide ranging measurements which are used to generate predictions for the satellites clocks and orbits. These predictions are periodically uploaded to the satellites and the satellites broadcast this data to the user receiver to support the user receiver positioning function.

Each satellite transmits GPS satellite signals, including a unique Pseudo-Random Noise (PRN) Code and a Navigation (Nav) message, on two carrier frequencies, L1 and L2. The L1 carrier is 1575.42 MHz and carries both the Nav message and the pseudo-random noise code for timing. The L2 carrier is 1227.60 MHz. The L2 signal is normally used for military purposes and is a more precise and complicated pseudo-random noise code. There are two types of PRN codes, called Coarse Acquisition (C/A) code and Precise (P) code. The C/A code, intended for civilian use, modulates the L1 carrier at a rate of 1.023 MHz and repeats every 1023 bits, thus the length of the C/A code is one millisecond. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the codes on L1 and L2 that gives information about the satellites' orbits, their clocks corrections and other system status. Ideally, as the GPS satellite ranging signals are broadcast to Earth, the GPS satellite ranging signals would directly reach the GPS user receiver with a range delay associated with speed of light propagation through a vacuum in an inertial reference system. However, along the route to the GPS user receiver, the GPS satellite ranging signals encounter some sources that cause the GPS satellite signals to be delayed in addition to the path delay associated with the speed of light propagation relative to range prediction models, and thus in error. The potential sources of such delays and errors include satellite ephemeris and clock errors, selective availability (SA), ionospheric and atmospheric effects, multi-paths, and receiver clock error.

In order to reduce or eliminate the delays and errors in the GPS satellite ranging signals, other ground stations, called differential GPS ground stations, are often used. Each differential ground station is stationary and ties all the satellite signal measurements into a local reference. Additionally, a differential ground station closest to the GPS user receiver receives the GPS satellite ranging signals containing the same delays and errors related to the GPS satellite signals as the GPS satellite signals acquired and tracked by the GPS user receiver for the same epoch time. The differential ground station is typically within a few tens of kilometers of the GPS user receiver. The differential ground station measures the range delay or timing errors and then provides this correction information to the GPS user receiver over a radio frequency (RF) wireless communications link. The GPS user receiver may be stationary for the time being, or may be roaming. The GPS user receiver applies these corrections to its ranging measurements to reduce the above errors. The differential ground station knows its fixed position and calculates an expected travel time for each GPS satellite signal. The calculation is based on a broadcast ephemeris of where each satellite should be positioned in space. The differential ground station compares a calculated travel time for the satellite ranging signals to an actual travel time measured for the signals, for all the satellites to determine the error correction information related to the signals for each satellite. The differential ground station then transmits the error correction information for each satellite to the GPS user receiver.

For conventional signal processing, when the GPS user receiver is first turned ON or activated to begin processing GPS signals, it searches for, acquires and locks on to the GPS satellite ranging signals from multiple satellites in view. The GPS user receiver also make distance measurements (called pseudoranges) for each satellite PRN code signal in view of the GPS user receiver, demodulate the Nav message data superimposed on the PRN code signals, apply any error corrections sent to it from the ground station if operating in the differential GPS mode, and uses this information to solve for the GPS user receiver's position and user receiver clock offset relative to GPS time. Additionally, in order to determine the distance between any satellite in view and the GPS user receiver, the GPS user receiver determines the actual travel time for the signal propagation delay and applies the error correction information received from the base station to calculate corrected travel time. The corrected travel time is then multiplied by the speed of light to determine the distance to the signal sending satellite. After acquiring the GPS satellite ranging signals of at least four satellites, the GPS user receiver solves for its position and time error relative to GPS time.

The conventional method of acquiring the GPS satellite ranging signals provides for the GPS user receiver to acquire one GPS satellite signal at a time. Signal acquisition is generally the most fragile phase associated with the GPS user receiver. One reason is that the C/A code is weak and a small level of interference, intermittent attenuation, or obstruction of the Line-of-Sight (LOS) from a satellite to the GPS user receiver can cause the acquisition process to fail for one or more of the ranging signals.

It would therefore be desirable to even further improve the ranging signal acquisition process in a manner that better ensures that rapid, reliable and robust acquisition of the ranging signals can be made by a GPS user receiver in challenged environments associated with signal power attenuation or interference, e.g. in-doors, under foliage, or under jamming conditions.

SUMMARY

The present disclosure provides a method and system to detect and acquire simultaneously a plurality of satellite ranging signals from each of a plurality of satellites in view of a GPS user receiver while simultaneously estimating a location of the GPS user receiver in a plurality of signal processing operating modes.

In one implementation, the method involves using a first receiver. The first user receiver acquires GPS signals from those satellites in view and processes these signals to obtain a GPS position and time solution.

The first user receiver then transmits to a second user receiver the set of initialization data and the first-user-receiver probable location to limit an Earth-referenced search space region and establish a search grid, in which the second user receiver is located, to predetermined geographic dimensions. The first user receiver transmits the time synch function to the second user receiver to enable the second user receiver to synchronize a user receiver clock and satellite ranging data as received at the first user receiver at an epoch time. Next, the second user receiver searches over the grid points within the search space region, and acquires simultaneously at least one of the satellite codes from the plurality of satellites in view of the first user receiver. The second user receiver then combines coherently received satellite codes and detects therefrom a second-user-receiver probable location.

In another implementation, the method involves using inputs from the plurality of satellites that are in view of a global positioning user receiver. The user receiver acquires GPS signals from those satellites in view and processes these signals to obtain a GPS position and time solution. The receiver may operate independently of a base station or may additionally receive initialization aiding data and a time synch function from a base station. The GPS receiver acquires GPS signals from those satellites in view and processes these signals to obtain a GPS position and time solution at an epoch time. Once the first position and time solution is determined, the GPS receiver determines an amount of time lapse since the first solution epoch time. Based on the amount of time lapse and internally saved data from the first positioning solution, the GPS receiver predicts a set of initialization data in order to limit an Earth-referenced space region and establish a grid having a set of predetermined geographic dimensions. Searching over the grid points in the space region, the GPS receiver acquires simultaneously at least one of the satellite codes from the plurality of satellites in view of the user receiver and coherently combines received satellite codes to detect therefrom a second probable location of the user receiver within the Earth-referenced space region at a subsequent epoch time corresponding to time lapse from the first epoch time.

A global positioning system (GPS) using inputs from a plurality of satellites in view of a GPS user receiver is also provided. In one embodiment, the system includes a plurality of GPS satellites, optionally a base station, and at least two GPS user receivers. The plurality of GPS satellites is configured to produce a plurality of GPS satellite ranging signals, wherein each GPS satellite signal includes a PRN code. Additionally, the first user receiver is configured to generate a set of initialization data to limit a search to an Earth-referenced search area region and grid. The first receiver is further configured to receive the plurality of GPS satellite ranging signals to produce time and frequency aiding data. This helps to reduce the search space to aid acquisition of the plurality of GPS satellite ranging signals and to reduce the size of the search space or to extend the duration of signal processing coherent integration time for the second receiver. The two GPS user receivers are in wireless communication with the plurality of GPS satellites, and in wireless or direct cable connection communication with each other. The second GPS user receiver is configured to receive the plurality of GPS satellite ranging signals from the plurality of satellites in view along with the time and frequency aiding data from the first receiver, and to search over at least one carrier phase combination within the search area region at a plurality of grid point locations. The second GPS user receiver is further configured to combine the plurality of GPS satellite ranging signals from the plurality of satellites in view to produce a power output. Using the power output, the second GPS user receiver simultaneously estimates its location by selecting that one grid point which corresponds to the maximum coherently combined signal power over all of the search grid points.

In another embodiment, the system includes a plurality of GPS satellites, optionally a base station, and at least one GPS user receiver. The plurality of GPS satellites is configured to produce a plurality of GPS satellite ranging signals, wherein each GPS satellite signal includes a PRN code. The user receiver is configured to receive the GPS satellite signals and is in wireless communication with the plurality of GPS satellites, and optionally in wireless communication with the base station. The GPS receiver receives and processes the GPS satellite signals to obtain a first position and time solution, and frequency calibration. The user receiver is further configured with a clock to maintain lapsed time from a GPS solution epoch time, and to internally store a set of initialization data to limit a future search to an Earth-referenced search area region and grid. At a later time, the user receiver computes another GPS position and time solution using its internally saved data and time reference as maintained by its clock. For subsequent fixes after the first, the GPS user receiver is further configured to combine the plurality of GPS satellite ranging signals from the plurality of satellites in view to produce a power output. Using the power output, the GPS user receiver simultaneously estimates its location by selecting that one grid point which corresponds to the maximum coherently combined signal power over all of the search grid points.

The method and system of the present disclosure allows for a more robust detection of GPS satellite ranging signals based on a simultaneous, all-in-view coherent PRN code signal processing scheme rather than acquisition of GPS signals one at a time. Additionally, the method and system may enable 10 dB or more improvement in signal-to-noise ratio (SNR) acquisition performance of the combined signals when compared to conventional acquisition approaches that acquire GPS PRN code signals one at a time. The method also enables a position and time solution capability while simultaneously acquiring the PRN code signals. The method and system also automatically enables removal of ranging errors common to both first and second receivers in the first embodiment, and subsequent ranging errors relative to the first position solution for the second embodiment, and minimizes the introduction of multi-path errors into code phase measurements.

The method and system of the present disclosure also provide a plurality of signal processing operating modes. A "Factory start" mode and a "Hot start" mode can provide the user receiver with an ability to quickly obtain necessary data in order to determine a probable location of the user receiver without undue delay and under stressed conditions as described below. In these modes, a second receiver begins processing GPS signals after a first receiver, which is already processing GPS signals and has obtained a GPS solution, transmits certain initialization data to the second user receiver. A "Subsequent fix" and a "Reacquisition mode" provide the user receiver with an ability to quickly determine a subsequent probable location and receiver clock time synch with undue delay when a prior probable location and time synch has been predicted, and particularly under stressed conditions as described below. Preventing undue delay of predicting a probable location of the user can be especially appreciated in conditions where a weak signal is present, in high interference prone environments, or when jamming conditions exist or a combination thereof are present.

Further areas of applicability of the present disclosure will become apparent from the detailed description provided hereinafter. It should be understood that the detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a flow chart of an operation for another signal processing operating mode as disclosed in the present disclosure.

DETAILED DESCRIPTION

The following description of various embodiments is merely exemplary in nature and is in no way intended to limit the present disclosure, its application, or uses.

Figure 1:
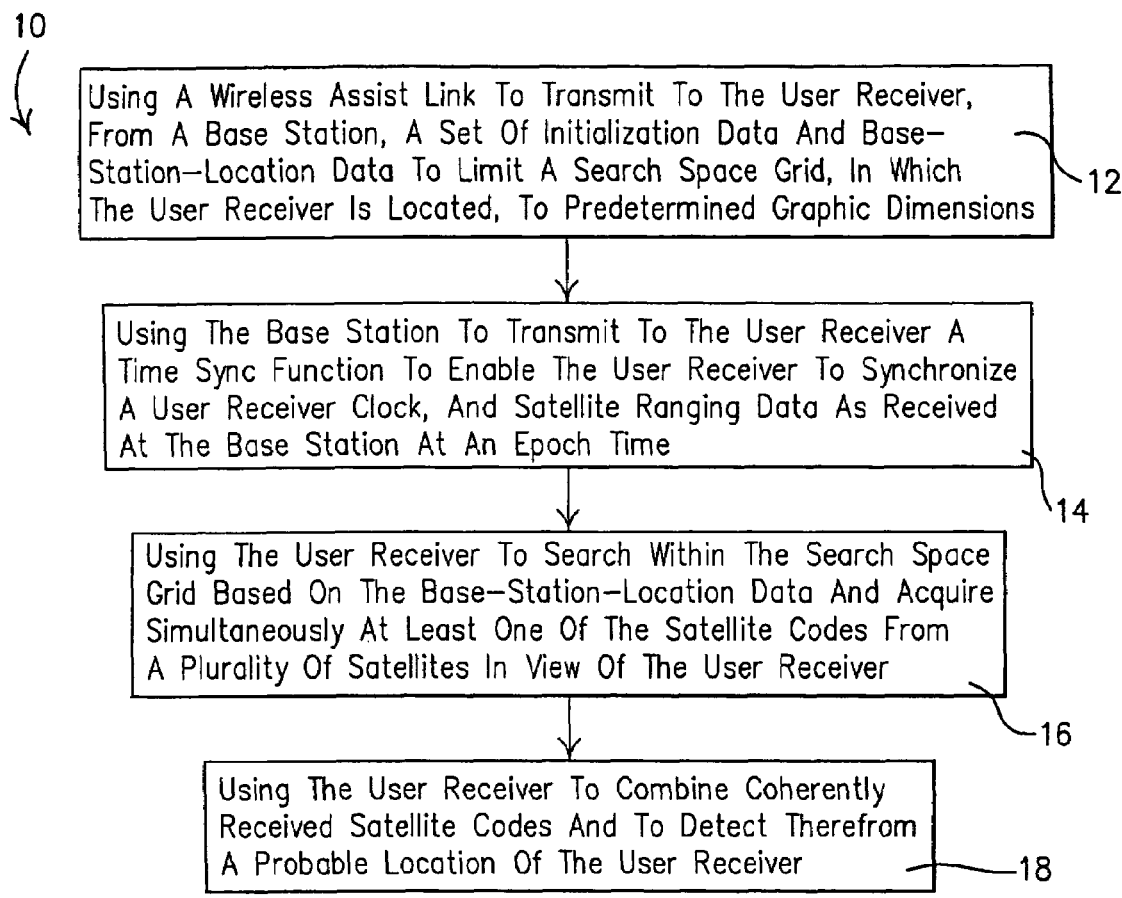
FIG. 1 is a flow chart of a method of the present disclosure for using inputs from a plurality of satellites that are in view of a global positioning system (GPS)

Referring to FIG. 1, the present disclosure illustrates one method 10 for using inputs from a plurality of satellites that are in view of a global positioning system (GPS). The plurality of satellites includes at least three satellites up to all satellites in view of the user receiver. The method 10 optionally includes using a wireless assist link to transmit to the user receiver, from a base station, a set of initialization data and base-station-location data at operation 12. Note that without loss of generality any user receiver within a connected network of user receivers may substitute for the base station, performing the same functions as the base station, and provide the same type of initialization information to aid operation of a second user receiver within the network. In this case, the transmission medium connecting the two user receivers can be either radio frequency (RF) wireless or a direct line cable connection. Thus, it will be understood that while certain embodiments and/or implementations of the present disclosure may be explained with reference to a base station (and information supplied from a base station) that the use of a base station is not necessary in implementing all of the embodiments and methods described and claimed herein.

Referring further to FIG. 1, the set of initialization data includes almanac or satellite ephemeris and clock data, size or boundary data, and satellite ranging signal data including satellite ranging signal measurement data. The boundary data comprises predetermined geographic dimensions to limit a search space grid, in which the user receiver is located. At operation 14, the base station transmits to the user receiver a GPS time synch function to allow the user receiver to synchronize its internal clock. It may also transmit satellite ranging data, as measured at the base station, to synchronize reception of the satellite codes in view of the user receiver.

After the GPS time synch function and other transmitted data are received by the user receiver, the user receiver starts a search within the search space grid based on the set of initialization data, which in this example is being provided by the base station. The user receiver acquires simultaneously a satellite code from each of the plurality of satellites in view of the user receiver, as indicated at operation 16. Even more, the user receiver may acquire all of a plurality of satellite PRN codes simultaneously from all satellites in view of the user receiver. At operation 18, while the user receiver is searching grid points in the search space grid, the user receiver combines a power output of each received satellite PRN code to determine a probable location of the user receiver. More specifically, the user receiver searches the search space grid, sums the power output related to each received satellite code for a plurality of grid point locations within the search space grid, and determines which grid point provides a maximum coherently combined power output for the received satellite codes. The maximum combined power output indicates a highest combined power output at a particular grid point location to identify the probable location of the user receiver.

Figure 2:
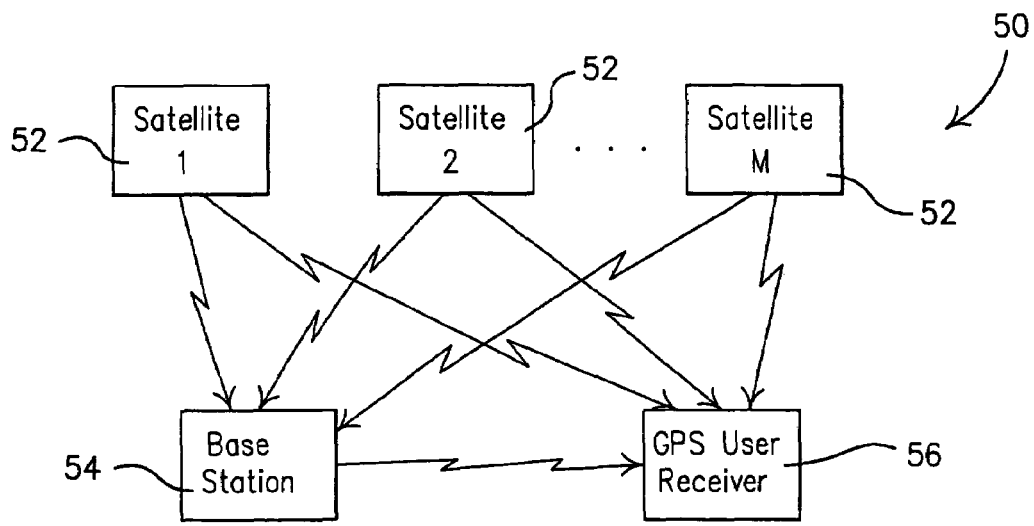
FIG. 2 is a block diagram of an exemplary system used to implement the method of FIG. 1.

Referring to FIG. 2, one example of a global positioning system (GPS) 50 of the present disclosure is shown for implementing the above-described operations. In this example, the GPS 50 comprises a plurality of GPS satellites 52, a base station 54 (which may be omitted if other subsystems are employed for providing the initialization information), and a GPS user receiver 56. The satellites 52 may each be in wireless communication with the user receiver 56 and the base station 54. Additionally, the base station 54 may be in wireless communication with the user receiver 56.

The locations of the satellites 52 are used as reference points to assist signal processing in order to determine the location of the user receiver 56. The satellites 52 comprise a constellation of "M" number of satellites in the Earth's orbit that are in view of the user receiver 56. Each one of the satellites 52 broadcasts one or more precisely synchronized GPS satellite ranging signals toward the Earth. The GPS ranging satellite signals include a Pseudo Random Noise (PRN) Code and Navigation (Nav) message carried on carrier frequency, such as an L1 and/or L2 carrier frequency. The L1 carrier is 1575.42 MHz and carries both the Nav message and the PR code for timing. The L2 carrier is 1227.60 MHz.

There are two types of PRN codes called Coarse Acquisition (C/A) code and Precise (P) code. The C/A code, intended for civilian use, modulates the L1 carrier at a rate of 1.023 MHz and repeats every 1023 bits. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the PRN codes that gives information about the satellite's orbit, clock corrections and other system status information.

As technology progresses, the satellites 52 may include more civilian and military codes on the L1 and L2 carriers and an additional carrier frequency called L5. For example, a satellite 52 may include two military codes and two civil signal codes on the L1 carrier, two military codes and one civil signal code in on the L2 carrier, and two civil codes on the L5 carrier. Additionally, instead of GPS navigation system satellites 52, the satellites 52 may comprise other existing satellite navigation systems satellites, such as, for example, Wide Area Augmentation System (WAAS) satellites developed by the Federal Aviation Administration (FAA) and the Department of Transportation (DOT) or Galileo satellite radio navigation system satellites, an initiative launched by the European Union and the European Space Agency. Without loss of generality, the system 50 may incorporate GPS codes, or codes of other satellite navigation system signals, if available, e.g. an integrated GPS-Galileo user receiver.

The base station 54 comprises a ground station that is a stationary receiver located at an accurately surveyed point. The base station 54 receives the GPS satellite ranging signals from each of the satellites 52. As each GPS satellite ranging signal is received by the base station 54 and the user receiver 56, the satellite signals may be adversely affected by ionosphere or atmospheric conditions, error in the GPS broadcast ephemeris and clock data, by multipath conditions, or other factors that may cause errors in the ranging signals reaching the base station 54 or the user receiver 56. The base station 54 transmits additional aiding data such as an unique set of initialization data, base-station-location data and size or boundary data. The set of initialization data includes GPS almanac or satellite ephemeris and clock data, and PRN ranging data including base station ranging measurements as received at the base station 54. The boundary data comprises predetermined geographic dimensions to limit a search space grid in which the user receiver 56 is located.

The user receiver 56 searches within the search space grid based on the base-station-location data and acquires simultaneously at least one of the satellite codes from a plurality of the satellites 52 in view of the user receiver 56. Additionally, the user receiver 56 may acquire simultaneously all of the satellite ranging codes from all of the satellites in view of the user receiver 56 in order to combine coherently, such as summing coherently, received satellite codes and to detect therefrom a probable location of the user receiver 56. The user receiver 56 attempts to coherently combine, or sums, a power output of each of received GPS ranging signals at each of the plurality of grid point locations within the predetermined geographic area, to determine a maximum power output value. The user receiver 56 uses the maximum power output value to extrapolate a probable location of the user terminal. The maximum power output value is indicative of a highest summed power output of all PRN codes present for each of the grid point locations, that identifies the probable location of the user receiver 56. The following paragraphs more specifically describe the functionally of the user receiver 56.

Through the wireless assist link, the user receiver 56 receives the set of initialization data to aid acquisition along with the base-station-location data, and the boundary data to assist in the acquisition search. Additionally, over the wireless link, the user receiver 56 is provided the GPS time synch function to reduce the search space grid associated with an unknown user clock error. The user receiver 56 also receives data on the accuracy of the time synch for use in the search from the base station 54, or time synch accuracy is inferred by the user receiver 56 based on the boundary data. Additionally, the user receiver 56 may utilize a time aiding function and a frequency aiding function to reduce user receiver clock error in order to reduce time search space.

The time aiding function may take on several forms, such as GPS time transfer or time sampling control method. The time transfer method provides a GPS time synch function to the user receiver 56 using an external RF aiding signal from the base station. On the other hand, the time sampling control method includes the base station 54 providing a command to the user receiver 56 to sample the GPS satellite ranging signal at a time epoch close to a time epoch used by the base station 54 to measure the GPS satellite ranging signals.

Frequency aiding may be implemented by the user receiver 56 by implementing signal phase or frequency lock (e.g. phase lock loop (PLL)) onto a base station radio frequency (RF) carrier signal. If a base station signal is generated using a high-quality ovenized crystal oscillator (OCXO) or an oscillator which is frequency calibrated by tracking the GPS satellite signals, the user receiver PLL will provide a frequency reference that is accurate and stable enough to reduce or eliminate frequency search. The user receiver PLL frequency reference will also support coherent integration times up to one second duration, following compensation for Doppler and motion of each of the satellites 52 relative to the user receiver 56.

Using the almanac or ephemeris data, the user receiver 56 can determine the number of GPS-satellite-ranging code signals in view for use to determine its location within the search space grid. The search space grid comprises a two-dimensional search grid. The search space grid alternately may comprise a three-dimensional search grid. For example, in order to determine a location for the two-dimensional search space grid, at least three satellites 54 in view of the user receiver 56 will be needed. On the other hand, at least four satellites 54 are needed in order to determine a location of the user receiver 56 within a three-dimensional search grid. Additionally, the user receiver 56 adjusts PRN coders to predictable offsets given by the following Equations or a variation thereof, to correlate simultaneously the GPS satellite PRN code signals received from each of the "M" satellites 52 in view in order to simultaneously detect the presence of all of the signals at some probable grid point location.

Figure 3:
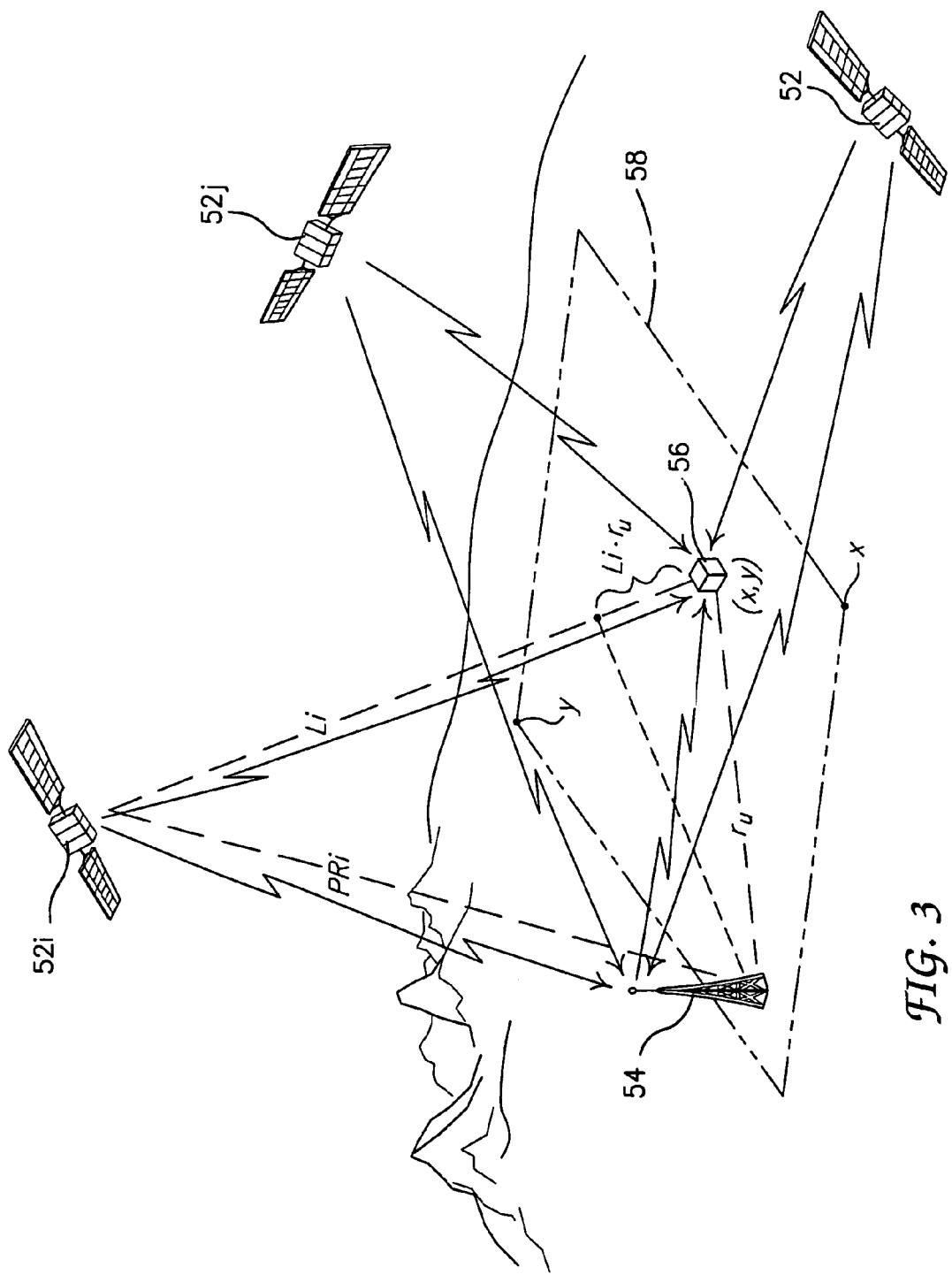
FIG. 3 is a graph illustrating an example of a two-dimensional search area used to acquire simultaneously the ranging signal inputs from all of the satellites.

Referring to FIG. 3, the search space grid 58 includes a set of search space grid points (x, y) that can be spaced about ¼ to ½ PRN code chip apart (a L1 C/A code chip corresponds to about 300 meters for C/A code and a P code chip corresponds to about 30 meters for P(Y) code). If the dimensions of the two-dimensional search region are about 10 km×10 km, then the number of search points are about 5,000 to 20,000 for C/A code chips. Additionally, reduction in the initial search region enables significant computational savings. For example, a 1 km×1 km region allows a factor of 100 savings, or only 50 to 200 grid points for C/A code chips.

Again referring to FIG. 3, the received code phases at the location of the user receiver 56 which are offset by a vector $\vec{r}_U$ from the base station 54 will include a range offset relative to the base station 54 of magnitude $\hat{L}i \cdot \vec{r}_U$, where $\hat{L}i$ is the Line-Of-Sight (LOS) unit vector to satellite "i". Thus, the set of N satellite PRN code pseudo range (PR) measurements received by the user receiver 56 relative to the base station 54 at epoch time $t_0$ is given by:

$$\hat{L}i \cdot \vec{r}_U + b = (PRi)_U - (PRi)_{BS}, \ i=1, 2 \ldots, N \quad \text{(Equation 1)}$$

where "b" is an unknown parameter that represents an unknown offset in a user receiver clock relative to the GPS time. "N" consists of all of the PRN code signals used in the processing summed from up to "M" satellites 52 in view. The relative code phase between two GPS PRN code signals "i" and "j" at epoch time $t_0$ is defined as the following:

$$\Phi ij(to) = PRi(to) - PRj(to) \quad \text{(Equation 2)}$$

where the PRN code ranging measurements i and j may be obtained from two different PRN code signals related to the same satellite 52i or two different PRN code signals obtained from two different satellites 52i, 52j. The relative code phase between two PRN code signals from the same satellite 52 will be almost identical. If the PRN code signals are obtained from two different frequencies from the same satellite 52i, the relative code phase may include an inter-frequency bias.

The difference between relative code phases as seen by the user receiver 56 and the base station 54 is given by:

$$\Delta\Phi ij(to) = (\Phi ij)_U - (\Phi ij)_{BS} \quad \text{(Equation 3)}$$

Substituting Equation 2 into Equation 3 and using Equation 1 to simplify the results gives:

$$\Delta\Phi ij(to) = \{\hat{L}i(to) - \hat{L}j(to)\} \cdot \vec{r}_U \quad \text{(Equation 4)}$$

The unknown user clock offset parameter "b" drops out of the differential relative code phase expression given by Equation 4. The Equations above, or a variation thereof, are used to predict the relative code phases within the user receiver 56, as the user receiver 56 simultaneously searches, acquires and combines the power from "N" GPS PRN code signals in view for the "M" satellites 52. This enables the user receiver 56 to acquire simultaneously "N" PRN codes, up to all of the PRN codes, for satellites in view of the user receiver 56. This is accomplished, for example, by using N correlators of the user receiver 56 and synchronizing corresponding N PRN code generator outputs chip sequences to phase offsets as given by the relative code phases predicted at a grid point.

The LOS unit vector $\hat{L}i$ can be computed within the user receiver 56 using the almanac or ephemeris data of one of the satellites 52, base station location, and GPS time information, as provided by the base station 54. The LOS unit vector is typically assumed to be the same at both the base station 54 and the user receiver 56. Thus, for practical applications, the timing error between the base station 54 and the user receiver 56 should not exceed about 1 millisecond. A much smaller time synch error, however, is beneficial for reducing the search space associated with receiver clock error. Ideally, the time synch function provided by the base station 54 is accurate to one microsecond or less. This error, however, will also be limited by a size of the search space grid 58.

Once the aiding data is sent to the user receiver 56, the user receiver 56 uses the above equations, or a variation thereof, to solve for the unknown parameter of the user receiver location. This unknown parameter is solved relative to the base station 54 for the two-dimensional solution $\vec{r}_U = (X,Y)$ for the two-dimensional search grid. Alternatively, if the search space grid 58 comprises the three-dimensional earth-referenced grid, a three-dimensional solution $\vec{r}_U = (X, Y, Z)$ is provided.

Alternatively, a variation of the above Equations allows determination of an absolute user receiver location (e.g., a location of the user receiver 56 relative to an Earth reference centered coordinate system, instead of the base station 54) within the search space grid 58. This absolute location can be obtained by adjusting the N correlators by using the relative code phases at each grid point, as predicted from the satellite ephemeris and clock data, and GPS time synch information supplied from the base station 54, within the processing method of the user receiver. However, this method may further require compensation for the ionospheric delay, which may be a sizable fraction of a code chip.

With static conditions over a small interval, or with frequency and Inertial Measurement Unit (IMU) aiding, the user receiver 56 may also coherently process multiple measurements over an extended interval of time. In such a formulation, other parameters can be added to improve performance. The GPS processing adjusts the PRN coder and signal phase for any change in the satellite motion over the correlation interval relative to the GPS epoch time $t_0$. This adjustment can be determined using the satellite ephemeris and clock data.

In order to coherently combine all PRN code signals, the user receiver 56 performs a combinatorial search over each signal carrier phase angle possibility associated with each PRN code at an initial measurement epoch time. The combinatorial search extends over all of the carriers phase combinations associated with the "N" PRN codes processed. That one carrier phase combination, grid point and user receiver clock combination that produces the strongest "spike" in the combined PRN code signal power output relative to noise level, e.g. a summed output from the "N" PRN code correlators that perform a slaved, relative code phase synchronized search as described above, indicates the most probable user receiver location. This search also includes a search over user clock error and a combinatorial search over all carrier phase combinations for all PRN code signals at each grid point. Additional information, such as knowledge of nominal code received power level, estimated noise level in each frequency band, satellite LOS attenuation due to the user receiver's 56 gain pattern relative to an attitude reference, and known LOS obstructions may be useful for eliminating signals and reducing the number of combinations, or weighing the power outputs to improve solution speed or performance. This information can also enable calculation of a suitable threshold to predict the reliability of computed solution operation performed by the user receiver 56.

The user receiver 56 may perform the combinatorial carrier phase search by applying a digital rotation of the sampled signal phase at epoch time $t_0$ for each PRN code signal prior to correlation. For example, an exhaustive search using 45 degree phase increments for five PRN code signals corresponds to $8^5 = 32,768$ possible combinations. The search may be efficiently synthesized using specially designed electronic circuits (e.g. Application Specific Integrated Circuits or ASICS) which implement large numbers of correlators for searching for maximum combined power over the entire search space, this search space consisting of the grid point, user clock error search and carrier phase combinatorial search. Additionally, the use of smaller carrier phase increments will reduce signal processing losses, but also causes an increase in computational burden or electronics hardware complexity. A reduction in carrier phase combination search space is possible using known signal phase relationships for each satellite 52.

At each grid search point, the user receiver 56 assumes that this particular grid search point is a probable location of the user receiver 56. During the processing, the user receiver 56 adjusts each internal PRN coder phase to an associated relative code phase as predicted by the Equations above. Additionally, the user receiver 56 correlates output data of the aforementioned associated PRN coder with down converted and frequency corrected data received from the user receiver 56 GPS antenna. If the user clock time offset and range offset associated with predicted code phase and the search space grid point corresponds to the actual user receiver range, there will be a power output corresponding to signal presence. If the presumed assumption is incorrect, the power output will correspond to only noise. In challenging environments (e.g. indoors or under interference conditions), the power output from one correlator may be insufficient to reliably detect the PRN code signal. When the power output from the "N" PRN code signals is coherently combined, the reliability of the detection of the PRN code signals are much improved. By coherently combining the correlator outputs from each of the received GPS satellite ranging signals, the PRN code signals can all be acquired simultaneously at the probable user receiver location.

Following an initial search of the PRN code signals, detection of the PRN codes signals, and determination of the probable location of the user receiver 56, a subsequent refining search for the location of the user receiver 56 location may be performed. Such refinement may involve adjusting the search space grid 58 in smaller steps (e.g. 1/10 code chip spacing) relative to an initial grid point solution until the power is further maximized, or by using small code phase adjustments to implement code phase error processing.

For the base station 54 and the user receiver 56 processing of data associated with multiple frequency bands, the inter-frequency bias for the base station 54 and the user receiver 56 is kept small relative to a code chip (C/A code chip is about 1 microsecond, and P(Y) code chip is about 0.1 microsecond). Alternatively, an additional small search layer associated with this bias may be necessary if coherent combining of all signals from all frequency bands is desired. However, significant processing gain may be achieved by only processing PRN code signal from one frequency band. For example, each satellite 52 may have two civil and two military signals on Earth coverage L1, so that ten satellites 52 in view could deliver a factor 40 (16 dB) advantage over the acquisition of one signal only, assuming satellite PRN code signals of comparable received power levels.

Without a high-quality, accurate and stable user receiver 56 oscillator or the base station frequency aiding as described above, an additional search over the user receiver oscillator frequency offset may also be needed, and coherent integration time duration may be limited. In this case, the extent of the additional frequency search space will depend on the frequency error of the oscillator, and the duration of the coherent integration time will depend on the stability of the oscillator.

To extend coherent integration time for each PRN code, the processing includes frequency correction for a satellite 52 Doppler relative to the user receiver 56. For long integration times, in order to maintain phase coherency over the correlation interval, the captured GPS signal sample data or internally generated code and phase data is also phase corrected for any satellite 52 or significant user receiver 56 motion over the correlation interval. On the other hand, an operator on foot can eliminate the user receiver motion degradation by simply holding the user receiver 56 still for a few seconds after pushing a button associated with the user receiver 56 while the broadcast GPS signal data is captured. Additionally, correction for the user receiver 56 differential Earth rotation affects is not necessary for search area grids within 10 km×10 km.

In another aspect of the system 50, if GPS Nav data stripping is applied (e.g. to extend the coherent integration time beyond the NAV message data bit transition boundary), to facilitate this data stripping, the user receiver 56 preferably samples at an appropriate time when the data bits can be predicted over the correlation interval. The base station 54 preferably provides the aiding and code phase information near the same time.

In a further aspect of the system 50, if message data cannot be predicted and relayed to the user receiver 56 in advance of signal reception by the user receiver 56, the user receiver 56 can buffer the digitized data, and wait for a feed forward of the NAV message data from the base station 54 wireless assist link, prior to processing.

In yet another aspect of the system 50, the user receiver 56 may coherently integrate information on dataless chips or channels, which will be available on future modernized L2 and L5 civil and other signals.

It should be noted that reduced performance is possible along with reduced processing complexity, in some situations. For example, reduced performance may be experienced with short coherent integration time durations limited to one NAV data symbol interval. Reduced performance may also be experienced if the correlator power outputs are combined non-coherently, e.g. by squaring the power outputs from In-phase (I) and quadra-phase (Q) channels, and then summing $I^2+Q^2$ for all of the PRN code channels. In this implementation, the search over carrier phase angle combinations 94 can be avoided.

Figure 4:
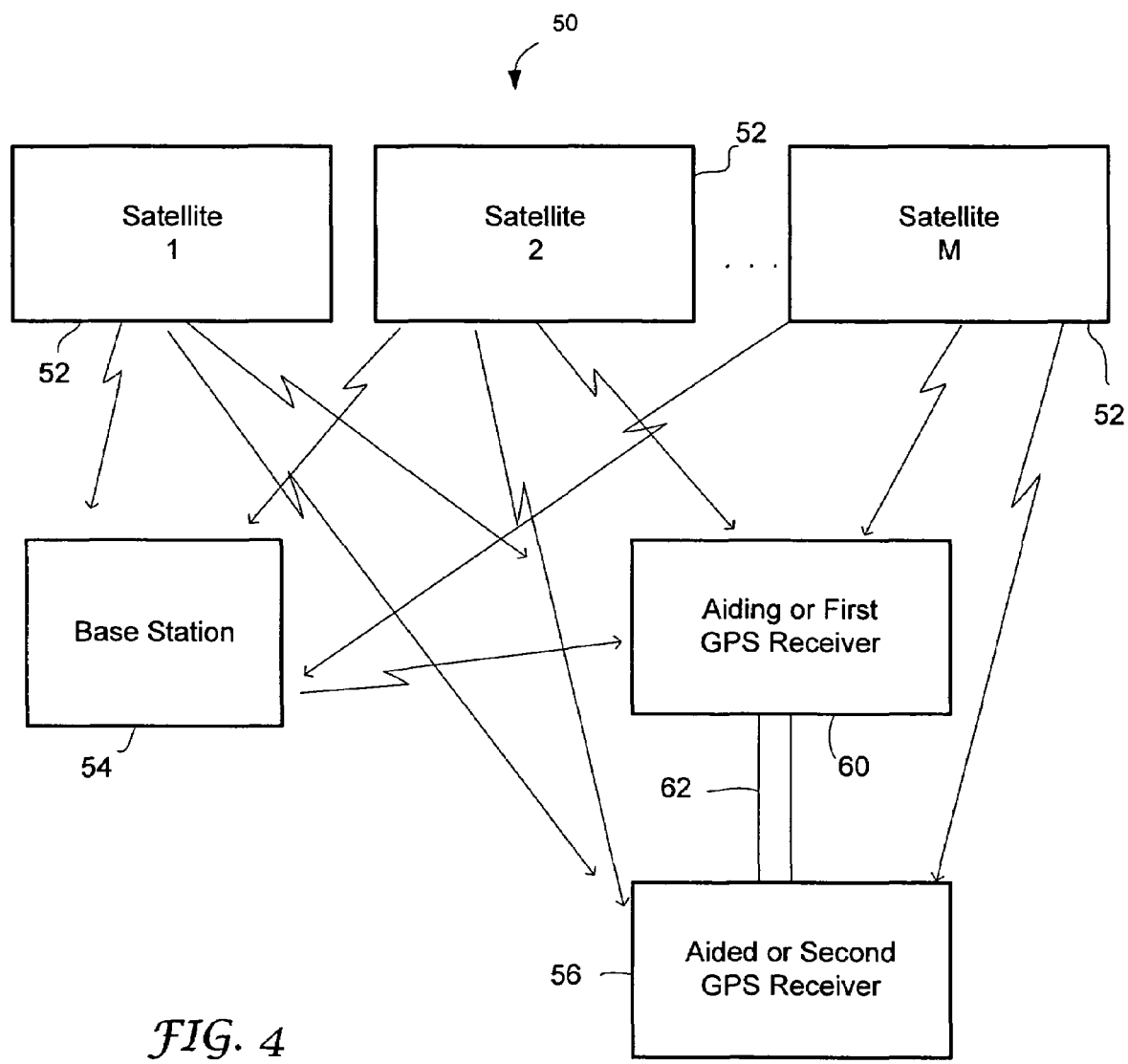
FIG. 4 is a block diagram of another aspect of the exemplary system as disclosed in the present disclosure.
Figure 5:
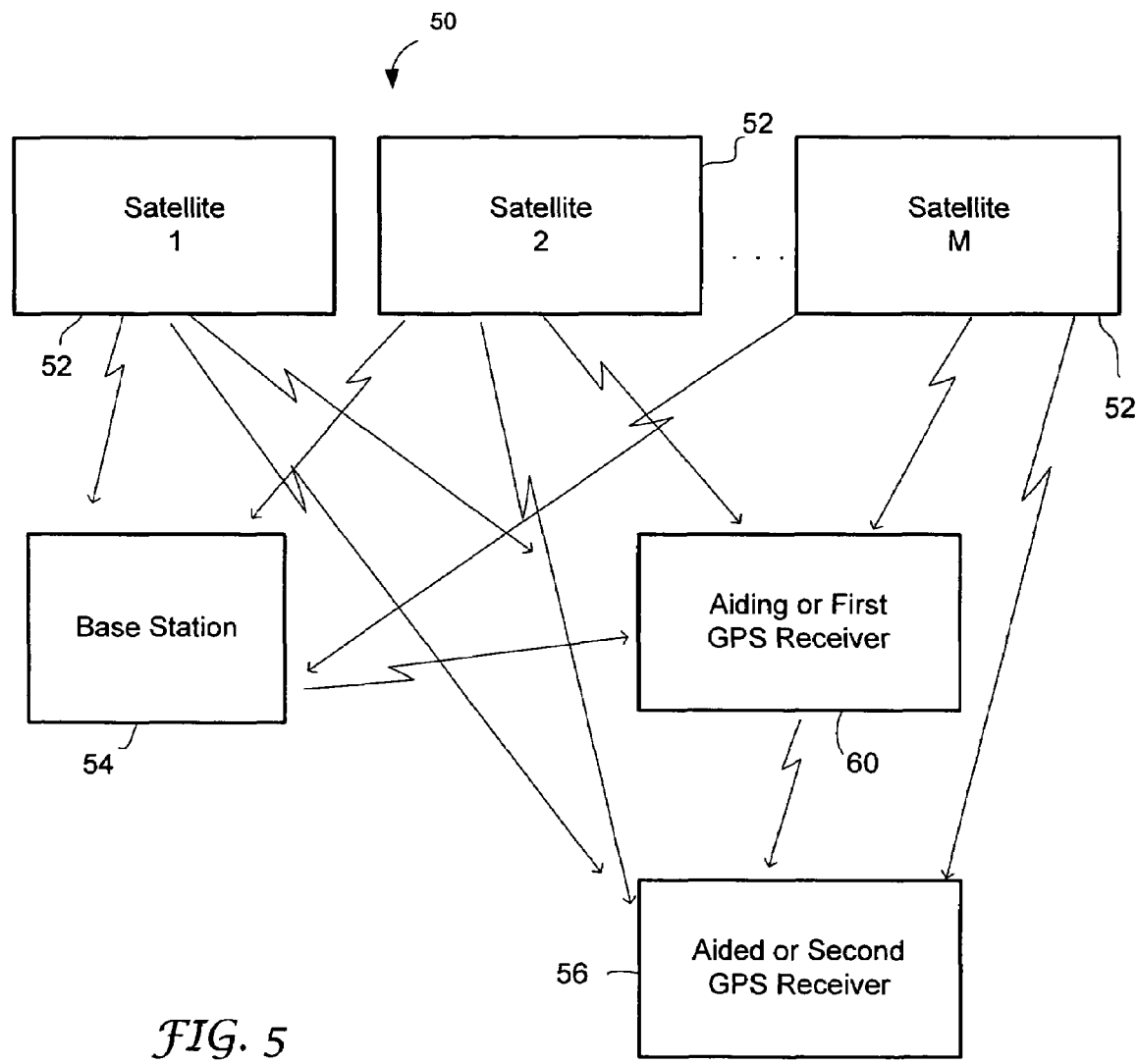
FIG. 5 is a block diagram of yet another aspect of the exemplary system as disclosed in the present disclosure.

Instead of the base station 54 providing the aiding data, the aiding data may instead be sent from a cell phone station (not shown), or a communications satellite (not shown) that also provides a time synch and geolocation service, or a navigation signal-of-opportunity, e.g. synchronized RF signals from TV or radio stations. Aiding data may otherwise be derived from a suitably designed second GPS/wireless user receiver/device within a local network of GPS/wireless devices 60 (FIGS. 4 and 5). Further discussion of the second user receiver 60 aspect will follow.

In challenging environments, repeated snapshot type of acquisition/position fixes may enable a robust acquisition/reacquisition and subsequent quasi-continuous time navigation capability. Such capability may be useful in situations when continuous tracking of the GPS PRN code signals may fail.

In less challenging environments, a hand-off of the above derived solution to initialize satellite PRN code and carrier signal tracking loops may be provided. Such a handoff may also be performed for the operations of initializing vector delay lock loop, or ultra-tight coupling implementation to continuously track all of the GPS satellite ranging signals in view, to validate the solution, to demodulate the Nav message data, and to refine position, time, and velocity estimates. In particular, this implementation also provides a robust technique to initialize ultra-tight GPS/INS (inertial navigation system) coupling implementations in interference prone environments.

In another aspect of the system 50, the user receiver 56 has a plurality of unique signal processing modes. These signal processing modes allow the user receiver 56 to process satellite codes in weak signal environments, interference prone environments, under jamming conditions, or any combination thereof. The plurality of signal processing modes can include a "Normal" or "Signal Tracking" mode, a "Factory Start" mode, a "Hot Start" mode, a "Standby" mode, a "Subsequent Fix" mode and a "Reacquisition" mode. The user receiver 56 may transition from any one of the above-mentioned modes to any other above-mentioned mode, unless otherwise mentioned. For example, the user receiver 56 may transition from the Hot Start mode to the Signal Tracking mode or from the Hot Start mode to the Standby mode. Each of the above-mentioned modes will now be described in detail. It will be appreciated that while these specific signal processing modes may be described as receiving information from a base station, that the use of a base station is not mandatory. If other components/subsystems are in communication with the user receive 56 and able to supply the needed initialization to the user receiver 56, then the use of a base station can be omitted entirely.

Signal Tracking Mode: The Signal Tracking mode can be used by the user receiver 56 to determine its probable location after the set of initial data has been obtained and saved by the user receiver 56 and its initial probable location has been determined. In the signal tracking mode, the user receiver 56 simultaneously detects and acquires at least one of the plurality of satellite codes from the plurality of satellites 52 in view of the user receiver 56. It then coherently combines the power of all received satellite codes to determine the probable location of the user receiver 56. The Signal Tracking mode does not require a base station, e.g. the First Fix may have been obtained in the clear, and the user receiver 56 could enter the Signal Tracking mode using repeated subsequent fixes.

Factory Start (also known as Cold Start) Mode: The Factory Start mode can be used when the user receiver 56 has no previously stored data for computing its probable location. This can be called an "out-of-box" mode of condition for the user receiver 56. The "out-of-box" mode state for the user receiver 56 traditionally requires the longest starting time. Traditionally, this is because the user receiver 56 must wait and receive the set of initialization (e.g. the Almanac data and/or the satellite ephemeris data) from the GPS satellite broadcast signals. Alternatively, the user receiver 56 may be quickly initialized to process GPS signals and obtain GPS position solutions when it receives the set of initialization and other related data from the base station 54 or via the second user receiver 60. After receipt of the initialization data, the user receiver 56 simultaneously detects and acquires at least one of the plurality of satellite codes from the plurality of satellites 52 in view of the user receiver 56. It then coherently combines the power of all received satellite codes to determine the probable location of the user receiver 56. Once the user receiver 56 transitions from the Factory Start mode to another one of the signal processing modes, the user receiver 56 preferably is prevented from transitioning back into the Factory Start mode unless a memory of the user receiver 56 becomes missing or erased.

Hot Start Mode: The Hot Start mode is used when the user receiver 56 has a set of expired initialization data and/or expired base-station-location data in its user memory. This type of user receiver is commonly called a "cold receiver". The cold receiver can immediately obtain an updated set of initialization data and/or base-station-location data via the base station 54 or the second user receiver 60. More specifically, this mode is used when the user receiver 56 has not been used for a predetermined time period (e.g., 20 minutes to several hours) and the set of initialization data (e.g., Ephemeris data) stored in the user receiver memory has expired. After receipt of the initialization data, the user receiver 56 simultaneously detects and acquires at least one of the plurality of satellite codes from the plurality of satellites 52 in view of the user receiver 56. It then coherently combines the power of all received satellite codes to determine the probable location of the user receiver 56.

Operation in Factory Start or Hot Start Modes: When in either the Factory Start mode or the Hot Start mode, the user receiver 56 can receive the set of initialization data and the base-station-location data from the base station 54, as well as the satellite codes from the satellites in view of the user receiver 56, as shown in FIG. 3. Alternatively, the user receiver 56 can receive the set of initialization data and the base-station-location data from the first user receiver 60, which would eliminate the need for the base station 54. The receiver 56 can be coupled to the second user receiver 60 via a cable 62 (FIG. 4) or wireless communication (FIG. 5). After receipt of the initialization data, the user receiver 56 simultaneously detects and acquires at least one of the plurality of satellite codes from the plurality of satellites 52 in view of the user receiver 56. It then coherently combines the power of all received satellite codes to determine the probable location of the user receiver 56.

Figure 6:
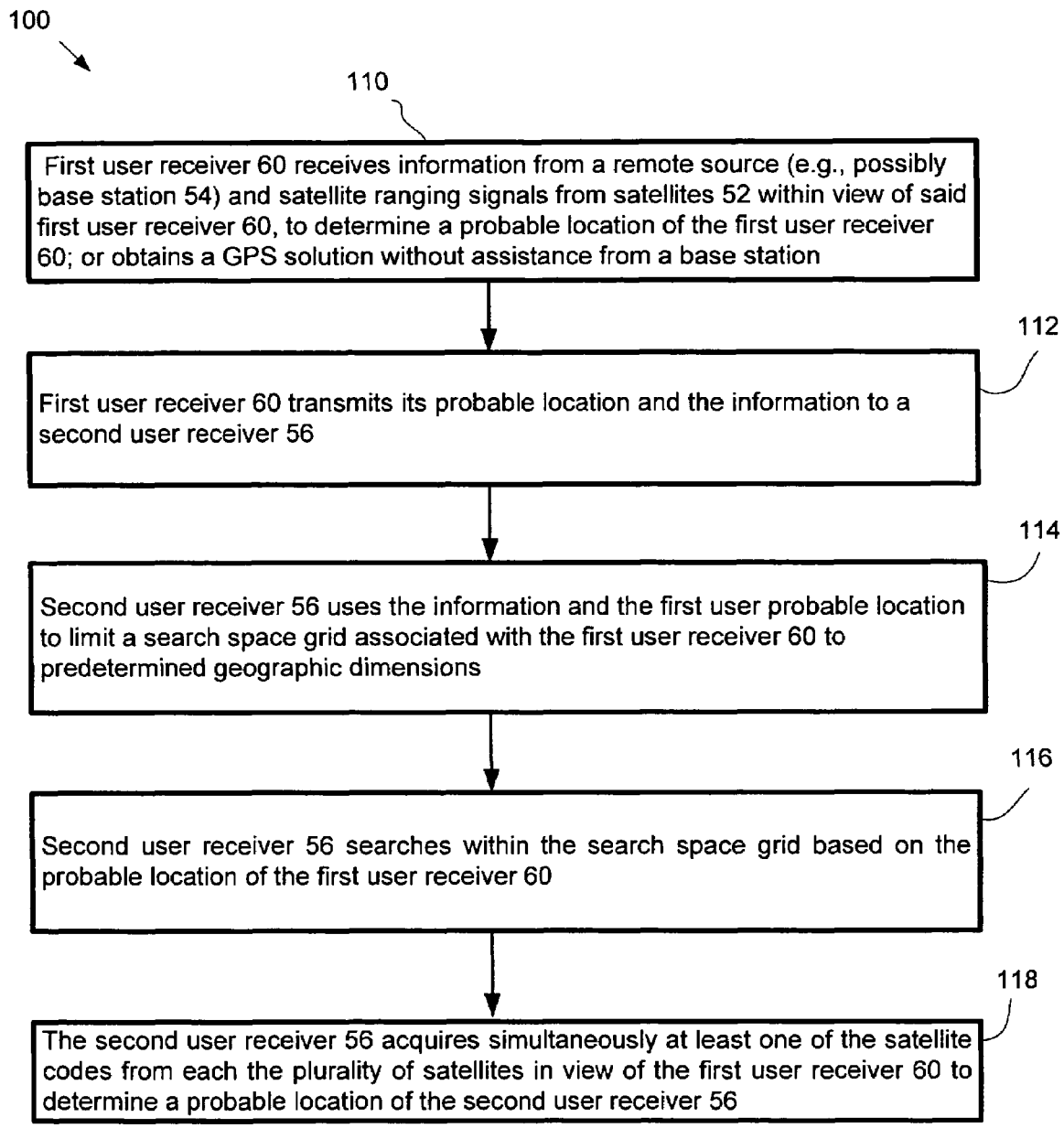
FIG. 6 is a flow chart of an exemplary operation for a signal processing operating mode as disclosed in the present disclosure.

Referring to FIG. 6, in operation 100, the first user receiver 60 receives the satellite ranging signals from the satellites 52 within view of the first user receiver 60, to determine its probable location, at operation 110. The first user receiver 60 transmits to the second user receiver 56 any information received from the base station 54, measured or predicted by the first user receiver 60, and/or received from the satellites 52 in view of the first user receiver 60. More specifically, the first user receiver 60 transmits to the second user receiver 56 the set of initialization data and a predicted probable location of the second user receiver 60 at operation 112. This allows the second user receiver to establish an Earth-relative search space region and grid, in which the user receiver 56 is located, to predetermined geographic dimensions, as indicated at operation 114.

The first user receiver 60 can also transmit the time synch function to the second user receiver 56 to enable the second user receiver 56 to synchronize its clock and oscillator, and satellite ranging data as received at the first user receiver 60 at an epoch time. Using this data, the second user receiver 56 acquires the satellite ranging signals and processes this data to rapidly obtain a probable geographic location of the second user receiver 56. In other words, the second user receiver 56 searches within the search space region grid based on the geometric dimensions at operation 116. The second user receiver acquires simultaneously at least one of the satellite codes from the plurality of satellites 52 in view of the second user receiver 60 at operation 118. This allows the second user receiver 56 to coherently combine received satellite codes and to detect therefrom the probable location, as described above.

The cable 62 coupling the two user receivers 56, 60 can include a predetermined length. For example, the predetermined length may be about 10 to 20 meters. If the cable 62 is used, the operator may enter the length of the cable 62 using either the user receiver 56 or the second user receiver 60 to further reduce the search space grid dimensions and improve accuracy. The length of the cable may be entered using a user interface (not shown) of the user receiver 56 or the second user receiver 60, prior to the second user receiver receiving any data from the first user receiver 60.

Alternatively, the first user receiver 60 can also transmit to the second user receiver 56 received code phases and received carrier phase data of the first user receiver 60 at an epoch time. With this data, the second user receiver 56 can directly predict relative code phases and carrier phases data at a reference epoch time and grid point, and directly acquire simultaneously at least one of the satellite codes from the satellites 52 in view of the second user receiver 60 without searching over the carrier phase parameters. After acquiring the satellite codes, the user receiver 56 coherently combines at least one of the plurality of satellite codes from the plurality of satellites 52 in view of the user to detect the probable location of the user receiver 56 as described above.

Standby Mode: The Standby mode occurs when an operator intentionally interrupts the signal processing of the user receiver 56 to allow the user receiver 56 to transition from the Signal Tracking mode to a semi-awake state. In the Standby mode, the user receiver 56 can power down certain of its features to save battery life such that a minimum amount of power is used to maintain necessary functions (e.g. functions related to its front-end signal processing, microprocessor and memory). In the Standby mode, the user receiver 56 saves all received, measured and computed data in the user receiver 56 memory that was obtained during the Signal tracking mode. This allows the user receiver 56 to quickly retrieve data to determine a subsequent probable location after the user receiver 56 transitions from the Standby mode to one of the position and time computing modes. This feature enables the user receiver 56 to quickly obtain at least a crude estimate of its probably location until updated data is received from the base station 54, the satellites 52, or both. After being commanded out of the Standby Mode by the operator, the user receiver 56 simultaneously detects and acquires at least one of the plurality of satellite codes from the plurality of satellites 52 in view of the user receiver 56. It then coherently combines the power of all received satellite codes to determine the probable location of the user receiver 56.

Subsequent Fix Mode: Once the user receiver 56 transitions from the Standby mode to the Signal Tracking mode, the user receiver 56 computes its probable location using the Subsequent fix mode. The Subsequent fix mode can include using data stored in the user receiver 56 memory. Additionally, the Subsequent fix mode can be scheduled to occur after the time lapse period occurs related to computing a last probable location for the user receiver 56. Each subsequently computed probable location can be stored in the user receiver memory. Additionally, the Subsequent fix mode can include the tracking feature of the signal tracking mode. This feature enables a plurality of consecutively computed probable locations to be saved and retrieved when the user receiver 56 transitions from the Standby mode to the Signal Tracking mode. In the Subsequent Fix Mode the user receiver 56 simultaneously detects and acquires at least one of the plurality of satellite codes from the plurality of satellites 52 in view of the user receiver 56. It then coherently combines the power of all received satellite codes to determine the probable location of the user receiver 56.

Reacquisition Mode: The Reacquisition mode is used when the user receiver 56 resumes the Signal Tracking mode after a short blockage of the satellite codes. Prior to entering the Reacquisition mode, the user receiver 56 can compute an initial probable location of the user receiver 56. In the Reacquisition Mode, the user receiver 56 simultaneously detects and acquires at least one of the plurality of satellite codes from the plurality of satellites 52 in view of the user receiver 56. It then coherently combines the power of all received satellite codes to determine the probable location of the user receiver 56.

Referring to FIG. 7, an exemplary operation 200 illustrating processing of the satellite signals using the Subsequent fix and the Reacquisition mode is provided. At operation 210, the user receiver 56 receives the set of initialization data and the base-station location data, from the base station 54, to limit the dimensions of the search space grid, in which the user receiver 56 is located, to the predetermined geographic dimensions. At operation 212, the user receiver 56 receives the time synch function, from the base station 54, to synchronize the internal clock and calibrate the oscillator such that the internal clock maintains accurate time without processing the satellite codes. The oscillator and the clock are free running and can be synched and calibrated as a result of lock on to the base station signal or based on a prior probable location determination. Again, if the user receiver is able to obtain this preliminary information from another source, then a base station would not be needed.

At operation 214, the user receiver 56 acquires simultaneously, with the time sync function at least one of the satellite codes from the satellites 52 in view of the user receiver 56 at the epoch time. At operation 216, the user receiver 56 coherently combines received satellite codes and uses the combined codes to detect a probable location of the user receiver 56.

The First GPS Fix may also be obtained by the user receiver as a stand-alone device, without aiding by a base station, thus eliminating the need for operations 210-216. Subsequent or Reacquisition Fixes may also be obtained using only internally stored data from the first fix and time as maintained by the receiver clock, thus without any aiding by a base station.

Each of the above-described modes can allow the user receiver 56 to store the probable location and all associated data in the user receiver memory. The associated data can include the set of initialization data, and measured code and carrier phases. Such data could also include a user receiver velocity at the epoch time and time lapse since the user receiver 56 determined the last probable location, also known as a reference location. The reference location can be stored in the user receiver memory as a reference position associated with a reference epoch time.

Using the stored associated data, the user receiver 56 can adjust code phase predictions and satellite ranging predictions as needed at a future probable location and a future epoch time. The user receiver 56 can also determine the time lapse at operation 218. The accurate time is maintained by the user receiver clock and the user receiver oscillator. Using velocity for the user receiver 56 at the reference location and the time lapse data from the reference epoch time, the user receiver 56 can predict a second set of initialization data, or more specifically propagate the set of initialization data (e.g., the user motion and satellite motion using Ephemeris data), at operation 220. The user receiver 56 can use a propagated set of initialization data to predict the geographic dimensions of the search space grid to search and acquire, simultaneously with the initialization data, at least one of the satellite codes from the satellites 52 in view of the user receiver 56 as indicated at operation 222. The user receiver 56 coherently combines received satellite codes to detect a subsequent probable location of the user receiver 56 at operation 224.

Once the user receiver 56 transitions from the Subsequent fix mode or the Reacquisition mode to the Signal Tacking mode, the user receiver 56 updates all data stored in its user memory from the base station 54 and the satellites 52 in view of the user receiver 56. Using the updated data, the user receiver 56 continues to process the satellite codes. The user receiver 56 can also predict the accuracy achieved in determining the probable position.

The method 10 and system 50 thus provide a plurality of signal processing operating modes. The Factory Start mode and the Hot Start modes provide the user receiver 56 with an ability to quickly obtain necessary data in order to determine a probable location of the user receiver 56 without undue delay by using the second user receiver 60 to begin processing satellite codes. The Subsequent fix mode and the Reacquisition mode provide the user receiver 56 with an ability to quickly determine a subsequent probable location with undue delay when a prior probable location has been predicted. Preventing undue delay of predicting a probable location of the user can be especially appreciated in conditions such as a weak signal, high interference prone environments, jamming conditions or a combination thereof.

The method 10 and system 50 provided herein enables automatic removal of errors common to both the base station 54 and the user receiver 56, or errors common to two receivers (if a base station is not to be employed) and is generally immune to multipath affecting one or a few satellite ranging signals. Processing by the base station 54 helps to minimize an introduction of multipath errors into ranging data sent to the user receiver 56. Additionally, the use of a plurality of signal processing modes can allow the user receiver 56 to better process satellite codes in weak signal environments, interference prone environments, jamming conditions or any combination thereof.

While various embodiments have been described, those skilled in the art will recognize modifications or variations that might be made without departing from the inventive concept. The examples illustrate the disclosure herein, and are not intended to limit it. Therefore, the description and claims should be interpreted liberally with only such limitation as is necessary in view of the pertinent prior art.

What is claimed is:

1. A method for rapidly acquiring and using a plurality of satellite ranging signals to determine position information, the method comprising:
   using a first user receiver to receive information from a remote source and satellite ranging signals from satellites within view of said first user receiver, to determine a probable location of the first user receiver;
   transmitting from the first user receiver, the probable location of the first user receiver and the information to a second user receiver;
   using the information and the first user receiver probable location to limit an Earth-reference search space region associated with the second user receiver to predetermined geographic dimensions;
   using the second user receiver to simultaneously obtain a plurality of satellite ranging signals from each one of a plurality of said satellites within view of said second user receiver; and
   causing the second user receiver to use the obtained satellite ranging signals and the probable location of the first user receiver to rapidly obtain a probable geographic location of the second user receiver by coherently combining the power in the received satellite ranging codes received from said plurality of satellites at a plurality of grid points within said search space region.

2. The method of claim 1, further comprising synchronizing operation of said second user receiver with said first user receiver to define an epoch time.

3. The method of claim 1, wherein the information comprises at least one of:
   code phase ranging data;
   almanac data;
   satellite ephemeris data;
   clock data;
   size or boundary data; and
   base station ranging measurements for the search space grid.

4. The method of claim 1, wherein transmitting from the first user receiver the probable location of the first user receiver and the information further comprises: transmitting from the first user receiver probable location of the first user receiver and the information via a cable.

5. The method of claim 1, wherein transmitting from the first user receiver the probable location of the first user receiver and the information further comprises transmitting from the first user receiver said probable location of the first user receiver and the information via a wireless communication link.

6. The method of claim 1, wherein the second user receiver acquires the satellite ranging signals after receiving the information, after performing a time synchronization operation, and after receiving the probable location of the first user receiver.

7. The method of claim 1, wherein the geographic dimensions comprise one of a two-dimensional region or a three-dimensional region of Earth coordinates.

8. A method for rapidly acquiring and using a plurality of satellite ranging signals to determine position information, the method comprising:
   using a first user receiver to receive satellite ranging signals from satellites within view of said first user receiver, to determine a probable location of the first user receiver;
   transmitting from the first user receiver the probable location of the first user receiver and additional information to a second user receiver to assist said second user receiver in determining its position;
   using the additional information and the first user receiver probable location to limit an Earth-reference search space region associated with the second user receiver to predetermined geographic dimensions;
   using the second user receiver to search a grid defined by said predetermined geographic dimensions to simultaneously obtain satellite ranging signals from a plurality of said satellites within view of said second user receiver; and
   causing the second user receiver to use the obtained satellite ranging signals and the probable location of the first user receiver to rapidly obtain a probable geographic location of the second user receiver by coherently combining the power in the received satellite ranging codes.

9. The method of claim 8, further comprising synchronizing operation of said second user receiver with said first user receiver to define an epoch time.

10. The method of claim 8, wherein the other information comprises at least one of:
    code phase ranging data;
    almanac data;
    satellite ephemeris data;
    clock data; and
    size or boundary data.

11. The method of claim 8, wherein the operation of transmitting from the first user receiver the probable location of the first user receiver and the other information comprises using at least one of a cable and a wireless link to perform said transmitting operation.

12. A method for enabling a user receiver to rapidly acquire and use a plurality of satellite ranging signals having satellite codes to rapidly determine a position of the user receiver, the method comprising:
    receiving a set of initialization data and remote source location data, from a remote source, to limit a first Earth-reference search space region, in which the user receiver is located, to predetermined geographic dimensions;
    receiving a time synch function, from the remote source, to synchronize a user receiver clock of the user receiver and calibrate a user receiver oscillator such that the user receiver clock and the user receiver oscillator maintain time;

acquiring simultaneously with said initialization data at least one of the satellite codes from each one of a plurality of satellites in view of the user receiver;

coherently combining said acquired satellite codes from a plurality of said satellites in view of said user receiver to detect therefrom a first probable location of the user receiver at a first epoch time;

determining a time lapse since the first probable location was detected;

predicting a second set of initialization data, using the time lapse and received set of initialization data, to limit a second Earth-reference search space region to a second set of predetermined geographic dimensions;

acquiring simultaneously at least one of the satellite codes from each of the plurality of satellites in view of the user receiver; and coherently combining said acquired satellite codes to detect therefrom a second probable location of the user receiver within the second Earth-reference search space region at a second epoch time.

13. The method of claim 12, further comprising:

determining a second time lapse since determination of the second probable location;

predicting a third set of initialization data to limit a third Earth-reference search space region to a third set of predetermined geographic dimensions;

acquiring simultaneously at least one of the satellite codes from the plurality of satellites in view of the user receiver; and coherently combining received satellite codes to detect therefrom a third probable location of the user receiver within the third Earth-reference search space region at a third epoch time.

14. The method of claim 12, wherein predicting the second set of initialization data further comprises:

powering down said user receiver into a standby operating mode in which the user receiver stops processing received satellite codes; and predicting the second set of initialization data when the user receiver transitions from the standby operating mode and again begins acquiring the satellite codes.

15. The method of claim 12, wherein predicting the second set of initialization data further comprises:

predicting the second set of initialization data after the user receiver stops acquiring said satellite codes for a predetermined period of time, and then restarts acquiring said satellite codes at a future epoch time; and predicting satellite orbit and clock motion associated with the lapsed time from saved information.

16. The method of claim 12, wherein predicting the second set of initialization data, using the amount of time lapsed, to limit a second search space grid further comprises:

computing a user receiver velocity at the epoch time to estimate and bound dimensions of user motion, and;

further limiting the second search space grid based on the user receiver velocity.

17. The method of claim 12, wherein the user receiver further uses other information saved within the user receiver comprising at least one of the following to assist in determining said second probable location:

code phase ranging data;
almanac data;
satellite ephemeris data;
clock data; and
size or boundary data.

18. The method of claim 12, wherein each said set of initialization data and the time synch function or user receiver clock are used to predict at least one satellite code phase for each of the plurality of satellites at a search grid point of the first Earth-reference search space region.

19. The method of claim 12, wherein the operation of combining coherently the received satellite codes comprises:

analyzing a power output produced by each of the acquired satellite codes at each of a plurality of grid point locations in the second search space region;

summing all of the power outputs in the user receiver for each of the plurality of grid point locations; and determining when a summed power output indicates a maximum coherently combined power value for the plurality of grid point locations within the geographic dimensions to identify the probable location of the user receiver.

20. The method of claim 12, wherein the geographic dimensions comprises a two-dimensional grid or a three-dimensional grid of Earth-reference coordinates.

21. The method of claim 12, wherein the first set of initialization data comprises at least one of:

almanac data
satellite ephemeris data;
clock data; and
size or boundary data relating to the first set of initialization data, and base station ranging measurements for the first Earth-reference search space region.

22. A method for rapidly acquiring and using a plurality of satellite ranging signals having satellite codes to rapidly determine a real time position of a user receiver, the method comprising:

using a first user receiver to receive said satellite codes and to detect therefrom a first-user-receiver probable location;

using the first user receiver to transmit to a second user receiver information and the first user receiver probable location, to limit an Earth-reference search space grid in which the second user receiver is located to predetermined geographic dimensions;

using the first user receiver to transmit a time synch function to the second user receiver to enable the second user receiver to synchronize a user receiver clock, satellite ranging data as received at the first user receiver at an epoch time, including code and carrier phase measurements of the first user receiver at an epoch time;

using the second user receiver to directly predict code phase data and carrier phase data relative to the second user receiver at the epoch time and grid point, and to acquire simultaneously at least one of the satellite codes from a plurality of satellites in view of the first user receiver; and using the second user receiver to search over the search space grid points and coherently combine received satellite codes from said plurality of satellites and to detect therefrom a second-user-receiver probable location.

23. A method for enabling a user receiver to rapidly acquire and use a plurality of satellite ranging signals having satellite codes to rapidly determine a position of the user receiver, the method comprising:

using a user receiver to receive satellite ranging signals from satellites within view of said user receiver, to determine a first probable location of the user receiver at a first epoch time;

determining a time lapse since the first probable location was detected;

predicting a set of initialization data, using the time lapse, received satellite Navigation message data and first probable location, to limit an Earth-reference search space region to a set of predetermined geographic dimensions;

acquiring simultaneously at least one of the satellite codes from each of the plurality of satellites in view of the user receiver, at a plurality of grid points within the search space region; and coherently combining said acquired satellite codes at each of said plurality of grid points within said search space region to detect therefrom a second probable location of the user receiver within the Earth-reference search space region at a second epoch time.

* * * * *